Dec. 19, 1967   G. CROMPTON   3,359,479
SYSTEM FOR BATTERY CHARGING
Filed June 30, 1964   2 Sheets-Sheet 1

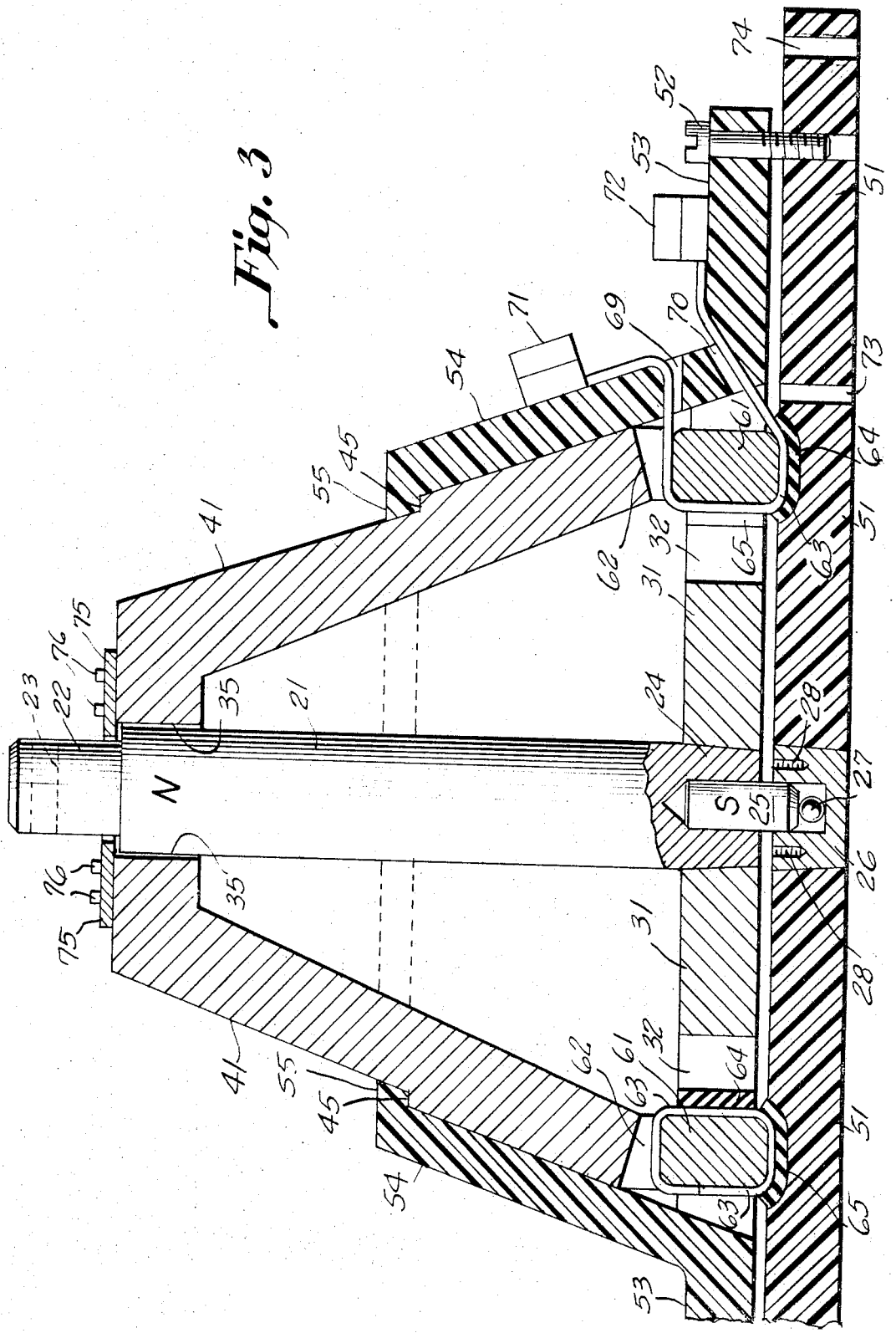

United States Patent Office 3,359,479
Patented Dec. 19, 1967

3,359,479
SYSTEM FOR BATTERY CHARGING
George Crompton, 710 Armada Road S.,
Venice, Fla. 33595
Filed June 30, 1964, Ser. No. 379,409
2 Claims. (Cl. 320—52)

The invention relates to systems for generating electricity and is typically embodied in wind motors driving D.C. generators connected to load, for example electric lights, and one or more storage batteries.

One object of the invention is to provide a system for the use of which no power company can charge for the kilowatt-hours used. Another object is to provide a system energized by the wind. Another object is to provide a system seldom needing repairs and needing little attention. Another object is to provide a system ideal for farms and houses on mountains remote from power transmission lines.

Another object of the invention is to provide a noiseless wind motor generating system. Another object is to provide an electric generating system which needs no attention for even years, except to put water, from time to time, into the electric storage batteries. Another object is to provide a simple regulated electrical circuit for many practical uses. Another general object is to provide an electricity generating system which is substantially foolproof and which can be taken care of by anyone after a short lesson.

Other objects will be in part obvious or in part pointed out hereinafter.

Figure 1:
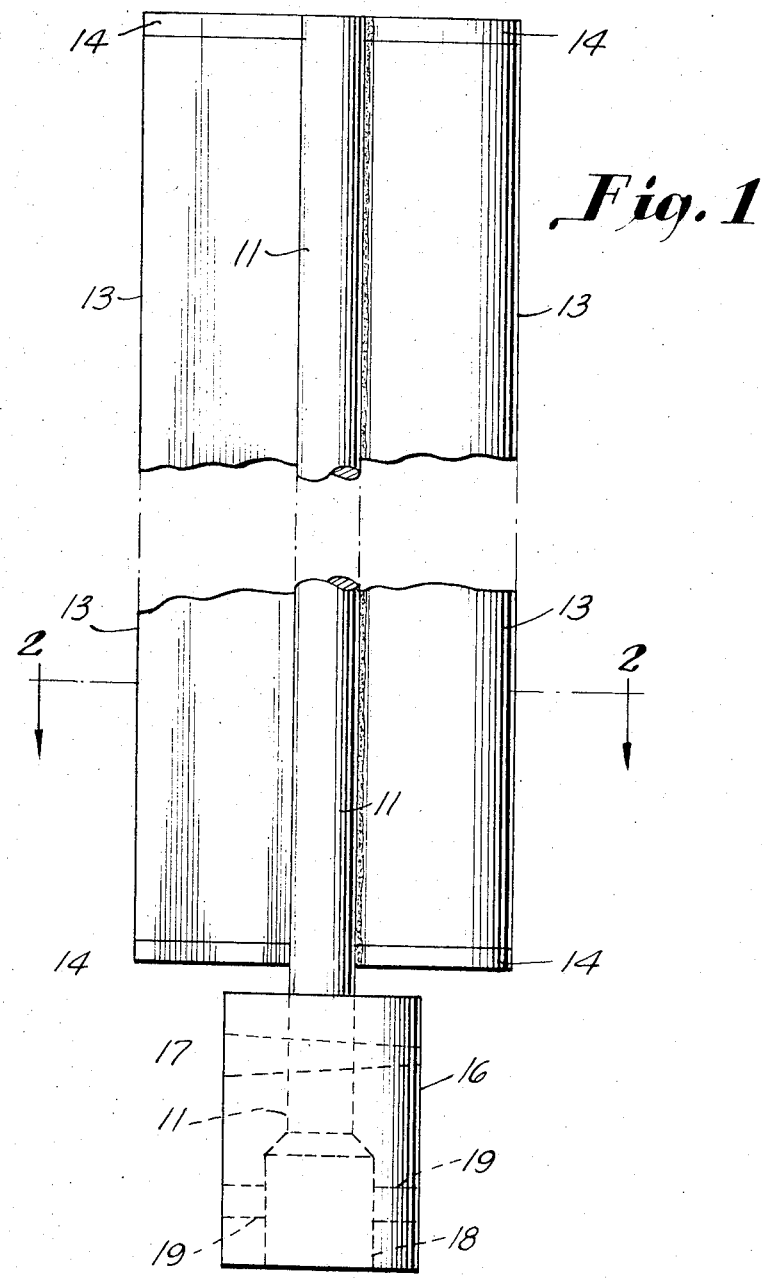
Figure 2:
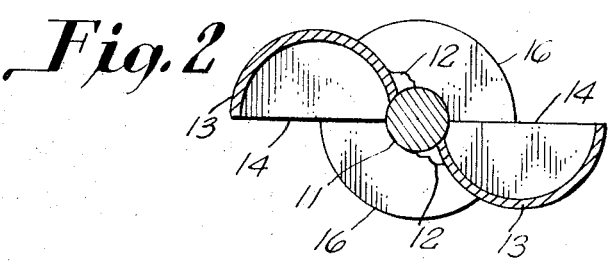

In the accompanying drawings, illustrating one of many possible embodiments of the invention:

FIGURE 1 is an elevation of a wind motor,
FIGURE 2 is a cross section taken on the line 2—2 of FIGURE 1,
FIGURE 3 is a circuit diagram.

Referring to FIGURES 1 and 2, a shaft 11 has affixed to it as by solder 12 a pair of vanes of the shape of sheet semi-cylinders 13. The ends of the vanes are closed by end plates 14. This is the wind motor and because it is exposed to rain and sun the parts should be made of corrosion resisting metal and I prefer brass or bronze and brass or bronze solder. There could be three vanes set 120 degrees apart instead of two set 180 degrees apart, but any more than four would probably produce aerodynamic interference. This wind motor operates without setting, with the wind from any direction, or with a rapidly changing wind. In principle it is the same as the wind motor of an anemometer, but shaped to give more power than the latter which usually has hemi-spherical vanes. If the motor is set on a steep incline of the ground or a roof, the shaft 11 can be perpendicular to the ground or roof instead of vertical.

Secured to the shaft 11 is a coupling 16 pinned to the shaft 11 by a taper pin 17 and having a bore 18 and a taper cross bore 19. This coupling 16 can well be made of brass. The axial shaft of any generator G shown in FIGURE 3 is coupled to the coupling 16 by a taper pin in the taper cross bore 19.

Referring now to FIGURE 3, four D.C. generators G are shown connected in series so that their E.M.F.'s are added, and they are connected to four batteries B, which typically are 12 volt automobile storage batteries and to a set of lights L, the batteries and the lights being in parallel. From the positive pole of the positive end generator G a line 111 goes to one end of the carbon pile P of a voltage regulator R and from the other end of the pile P a line 112 goes to a rectifier Re and from this another line 113 goes to the main positive line 115 of the batteries B and the lights L.

The electric current returns by way of the main negative line 116 through main switch 117 to the negative pole of the negative end generator G. It is well to provide a hand switch 120 to break the circuit between the batteries B and the lights L.

A shunt line 121 runs from the line 111 to a shunt solenoid coil 122 of the regulator R and the core 123 of the coil 122 is on the end of a lever 124 pivoted at 125 to the frame 126 and carrying an abutment 127 engaging the pile P. The solenoid 122, 123 is opposed by a spring 131 the tension of which can be adjusted by a hand wheel 132 operating a screw 133 in a stationary nut 134 fastened to the frame 126. On the end of the screw 133 is a block 135 engaging the spring 131. The carbon pile P abuts the frame 126.

A line 141 runs from the other end of the shunt solenoid coil 122 to the negative pole of the negative end of the generators G, thus completing the shunt circuit. It is convenient to have a switch 142 in this line 141. It is also convenient to have a switch 143 in the line 112.

The carbon pile regulator R can be set to deliver a maximum E.M.F. and in this case is set to deliver 12 volts. As one or any or all of the lights that have their switches closed are connected in parallel to 12 volt batteries B they will receive 12 volts unless all of the batteries are undercharged. And they cannot receive more than 12 volts from the generators G because of the regulator R. But when the wind blows hard enough to develop 12 volts or more E.M.F. from the generators G, any battery which is undercharged so as to have an E.M.F. of less than 12 volts will receive current from the generators G through the regulator R but never at an E.M.F. of more than 12 volts, so that no battery can be overcharged. And when there is no wind or the wind is light the batteries B cannot discharge through the generators G on account of the rectifier Re between lines 112 and 113.

It is well to have a way to charge the batteries rapidly when the wind is strong. Press a push button switch 151 in a shunt line 152 through a voltmeter 153 and if the voltmeter, in its inevitable fluctuations because no wind is ever steady, stays mostly above 12 with few lulls that carry it below 12 you can make the second check. Open the switches 117 and 120 and then close a push button switch 161 in a shunt line 162 through a voltmeter 163. If this voltmeter reads below 12, close a switch 171 in a shunt line 172 through a rectifier Re 173, which line 172 is a heavy duty line that cuts out the regulator R. Now close the main switch 117 but leave the switch 120 open and open the switch 143. Now the weak battery or batteries will be rapidly charged. Take off the battery caps and keep ears and nose alert to battery gassing and check the voltmeter 163 from time to time.

When, while charging the batteries as just described the E.M.F. of the combined generators G falls below 12 volts, the batteries will not discharge through the generators because of the rectifier 173. But the voltmeter 163 should be read from time to time, first opening the switch 171, so that the fast charge operation can be stopped when the voltmeter 163 reads 12. Obviously when one battery is fully charged, but the other batteries are weak, the fully charged one can be cut out of the line by removing a battery cable, and two or three cables can be removed to give a fast charge to two or one battery.

In FIGURE 1 the vanes 13 and the shaft 11 are shown broken away in order to indicate that they can be much higher (longer vertically) than relatively shown. Thus more power will be collected. This is a noiseless wind motor (FIGURES 1 and 2) and never needs setting for any change of direction of the wind. It is inexpensive and easy to make.

There is no magic in the 12 volts selected for the system. Electric lights for yachts frequently operate on 6 volts and there are 6 volt electric storage batteries. Systems of less than 6 volts are useful. I have shown four dynamo generators G, but there might be only one; I have shown four batteries B, but there might be only one, and there could be more than four of either.

The carbon pile P is a variable resistance device. Other such could be used. The spring 131 exerts mechanical pressure, but other means to do so could be used, such as a weight. The adjustment for the voltage regulator R is the wheel 132, the screw 133 and the nut 134, but a variable inductance solenoid coil could be substituted for the simple coil 122 shown as an adjustment for the voltage regulator R.

The circuit G, 111, P, 112, Re, 113, 115, B, 116, G is the main circuit. The circuit G, 111, 121, 122, 141, G is a shunt circuit. The circuit G, 172, Re 173, B, 116, G is another shunt circuit. The circuit G, 152, G is another shunt circuit and the circuit B, 162, 116, B is another shunt circuit. The utility circuit is 115 through L to 116 including a battery B or a dynamo (generator) G or both.

It will thus be seen that there has been provided by this invention an electricity generating system in which the various objects hereinabove set forth together with many thoroughly practical advantages are successfully achieved. As many possible embodiments can be made of the invention and as many changes can be made in the embodiment described herein, it is to be understood that all matter hereinbefore set forth or shown in the accompanying drawings is to be interpreted as illustrative and not in a limiting sense.

I claim:

1. A D.C. electrical generating system comprising a D.C. electricity generating dynamo, an electric storage battery, a voltage regulator, a variable resistance device in said voltage regulator, means to exert mechanical pressure on said variable resistance, a solenoid opposing said means to exert mechanical pressure, a solenoid coil as a part of said solenoid, a main circuit from said dynamo to said variable resistance to said battery and back to said dynamo, a rectifier in said main circuit, a shunt circuit connecting said dynamo and said solenoid coil, and a second shunt circuit connecting the dynamo and the battery, said second shunt circuit having a rectifier and also having a switch.

2. A D.C. electrical generating system according to claim 1 having an adjustment for the voltage regulator.

References Cited

UNITED STATES PATENTS

| | | | |
|---|---|---|---|
| 1,062,918 | 5/1913 | McGary | 320—52 X |
| 1,163,960 | 12/1915 | Turbayne | 320—52 X |
| 1,241,485 | 9/1917 | Crosby | 320—52 |
| 875,205 | 12/1907 | Muskowitz | 320—51 X |
| 1,319,215 | 10/1919 | Foote | 320—51 X |
| 1,579,505 | 4/1926 | Bouche | 320—61 X |
| 3,117,269 | 1/1964 | Pensak. | |
| 3,264,545 | 8/1966 | Kott | 320—2 X |

OTHER REFERENCES

Steinmetz: Theory and Calculation of Electrical Apparatus, McGraw-Hill Co., New York, first ed. 1917, pp. 452–453.

ORIS L. RADER, *Primary Examiner.*

G. SIMMONS, *Assistant Examiner.*

UNITED STATES PATENT OFFICE
Certificate of Correction

Patent No. 3,359,479                                            December 19, 1967

George Crompton

It is hereby certified that error appears in the above numbered patent requiring correction and that the said Letters Patent should read as corrected below.

In the drawings, Sheet 2, the drawing for FIG. 3 should be cancelled, the drawing shown below inserted instead as FIG. 3:

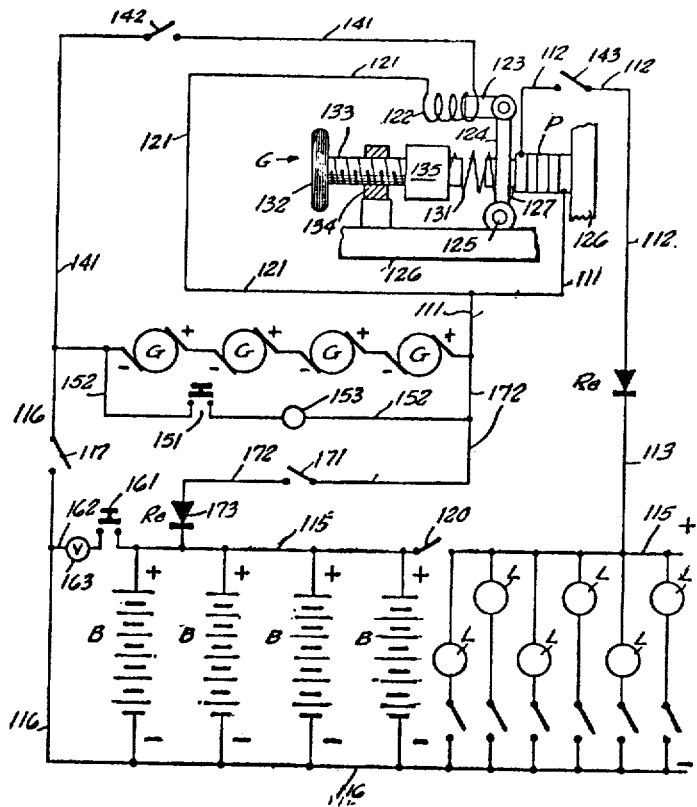

In addition to the above figure, at the top, a little left of center, above the numeral "132," the letter "G" should read —R—.

Signed and sealed this 22nd day of October 1968.

[SEAL]

Attest:

EDWARD M. FLETCHER, JR.,
*Attesting Officer.*

EDWARD J. BRENNER,
                                           *Commissioner of Patents.*